Dec. 18, 1934. G. A. GLEASON 1,984,738
REEL
Filed Dec. 5, 1932

Inventor:
GEORGE A. GLEASON,
by Usina & Rauber
his Attorneys.

Patented Dec. 18, 1934

1,984,738

UNITED STATES PATENT OFFICE 1,984,738

REEL

George A. Gleason, Worcester, Mass., assignor to The American Steel and Wire Company of New Jersey, a corporation of New Jersey Application December 5, 1932, Serial No. 645,799

2 Claims. (Cl. 242—124)

This invention relates to improvements in reels and has for one of its objects the provision of a collapsible reel which is durable and cheap and easy to manufacture.

These and other objects will be apparent after referring to the drawing, in which.

Figure 1:
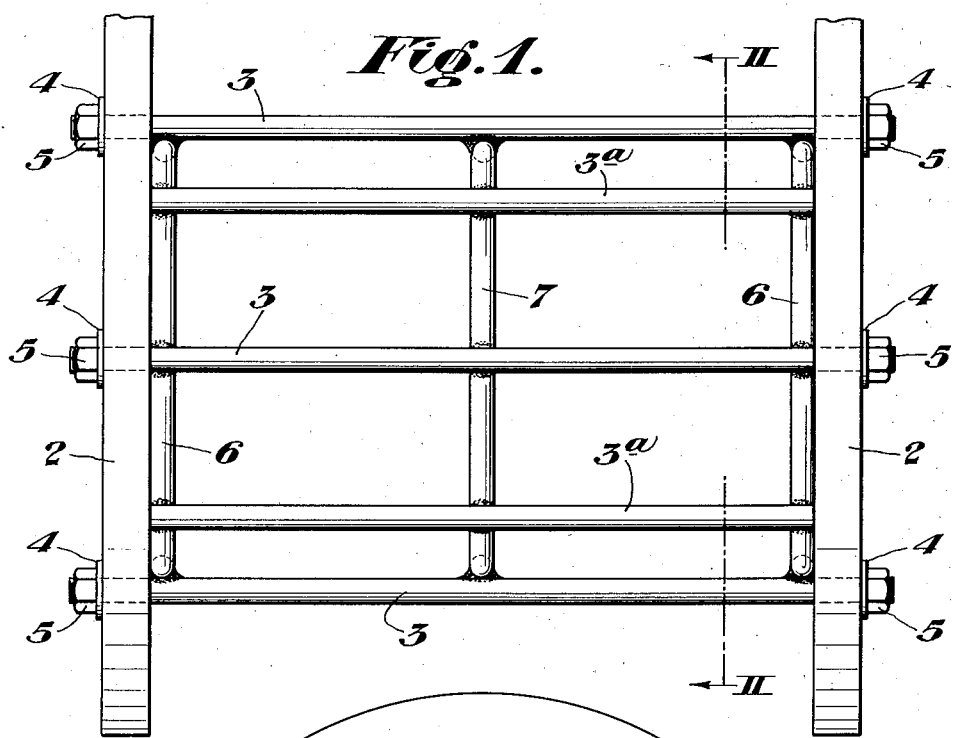
Figure 1 is a side elevation of the reel of my invention.
Figure 2:
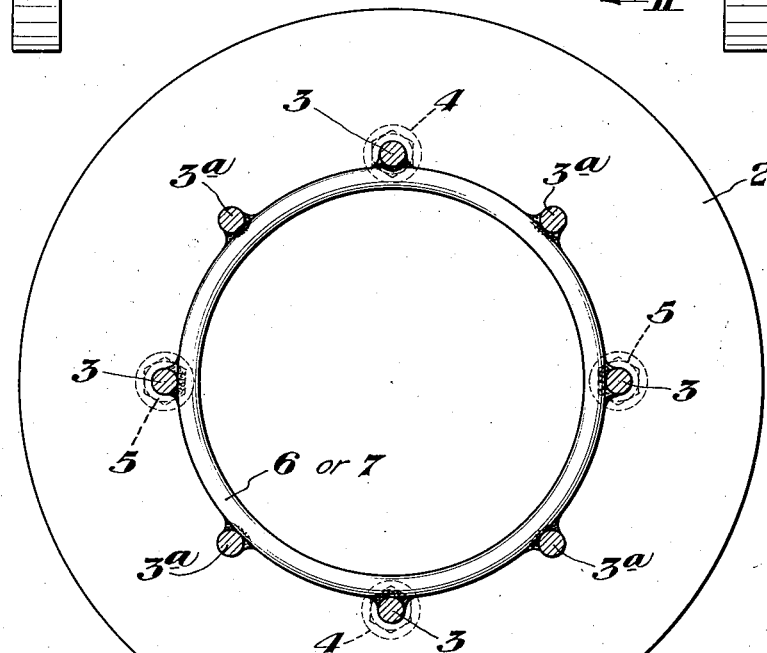
Figure 2 is a sectional view taken along the line II—II of Figure 1.

Referring more particularly to the drawing, the numeral 2 indicates the usual reel heads, which are generally constructed of wood. According to the present invention, the spool of the reel comprises a plurality of rods 3 and 3ª disposed in circular relationship to the heads 2.

The rods 3 extend through the heads and have threaded ends in order that they may be secured thereto by a lock washer 4 and nut 5. The rods 3ª are shown as abutting the inner surfaces of the heads 2, but if desired may extend slightly into the heads.

The numeral 6 indicates a pair of circular rings welded to the inner surfaces of the circularly disposed rods 3 and 3ª, and in abutment with the inner surfaces of the heads 2. A similar ring 7 is welded to the inner surfaces of the rods intermediate their ends.

While I have shown and described one specific embodiment of my invention, it will be understood that I do not wish to be limited exactly thereto, since various modifications may be made without departing from the scope of my invention, as defined in the following claims.

I claim:

1. In a reel, a pair of heads having a plurality of relatively small apertures, a spool portion comprising a plurality of bars, a number of which extend through the apertures in said heads, a supporting ring welded to said spool adjacent each of its ends, a supporting ring welded to said spool intermediate its ends and means for fastening the extended bars to said heads.

2. In a reel, a pair of heads, a spool portion comprising a plurality of metal bars, a number of which extend through holes in said heads, a supporting ring welded to the interior of said spool adjacent each of its ends, a supporting ring welded to the interior of said spool intermediate its ends, and fastening means on each of the bars extending through both of said heads for clamping said heads to the supporting rings adjacent said spool ends.

GEORGE A. GLEASON.